Oct. 12, 1954

H. H. BLAU 2,691,599

GLASSES

Filed Nov. 14, 1950

INVENTOR
HENRY H. BLAU
BY
Jerome R. Cox

Patented Oct. 12, 1954

2,691,599

UNITED STATES PATENT OFFICE 2,691,599

GLASSES

Henry H. Blau, Columbus, Ohio, assignor to The Ohio State University Research Foundation, Columbus, Ohio, a corporation of Ohio Application November 14, 1950, Serial No. 195,691

19 Claims. (Cl. 106—47)

The invention disclosed in this application relates to new glasses which are especially useful for transmission of rays of relatively long wave lengths. Prior hereto glasses have usually been formed of fused silica or fused mixtures of silica with various other components. Alkalies, alkaline earths, borates and similar materials are usually added to glass batches. I have found that certain glasses can be made that are entirely free of silica and of such other materials. Some suggestion has been made that glasses should be formed of pure germania. I have discovered that by mixing germania and lead oxide, fusing the components to a liquid mixture and allowing the mixture to solidify, I obtain a glass which has qualities of allowing the transmission of rays of relatively long wave lengths in many respects superior to any other glasses of which I know and which has higher refractive indices than most known glasses. The addition of certain other substances in many instances, is also an aid either in securing better transmission or in securing stability and resistance to chemical attack, and also in improving the viscosity of the glasses. I have found that pure germania glass does not have as good properties in respect to transmission as the glasses which I disclose herein and I have found that it is unstable when exposed to the atmosphere. Germania glasses unfortunately have a much greater tendency to devitrify than do silicate glasses. I have also shown by experiment that pure germania glasses are not as satisfactory in the above and other respects as the glasses formed of the several components which I have disclosed herein.

One of the objects of my invention, therefore, is the production of new glasses.

A further object of my invention is the production of glasses having unusual optical properties such as relatively high indexes of refraction, relatively low dispersion, and relatively high opacity to X-rays and other low wave length radiations.

A further object of my invention is to produce glasses free from or low in alkalies to which colors can nevertheless be imparted.

A further object of my invention is the production of glasses having better qualities with regard to transmission of rays of relatively long wave length, stability, resistance to chemical and atmospheric attack, etc., than previous glasses of which I am aware.

A further object of my invention is the provision of glasses which allow better transmission of much of the infra red rays.

A further object of my invention is the provision of glasses, having relatively great transmission of infra red rays, which are relatively stable to atmospheric conditions, to abrasion and to chemical attack.

Further objects and features of my invention will be apparent from the subjoined specification and claims when considered in connection with the accompanying drawings illustrating certain embodiments of my invention.

Figure 1:
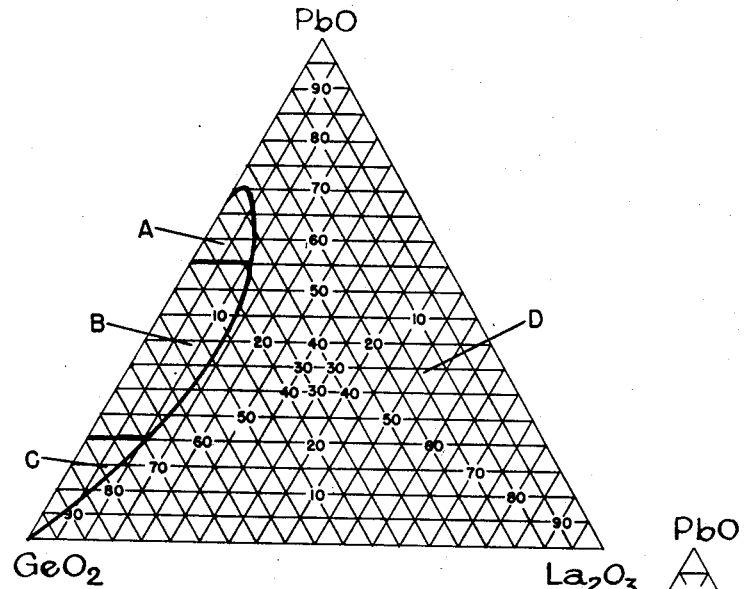
Fig. 1 is a diagram showing the limits of the usable glass-forming field of a system of glasses formed by lead oxide, germania and lanthana.

Referring to the drawings, I show the glasses formed from the components lead oxide, germania and lanthana and having percentages of the components which may be plotted to lie within the areas A, B and C, are useable. Glasses formed of percentages of compounds plotted to lie within the area A are stable and have good transmission of long wave rays. Glasses formed of components having percentages plotted to lie within the area B are stable glasses but the transmission of long wave rays is below the average of the transmission of the glasses formed from percentages of components lying within the area A. Glasses formed of percentages of components plotted to lie within the area C are subject to atmospheric attack but the transmission of fresh glasses formed from percentages of the components shown is fairly good. In my attempts to form glasses having percentages of components lying within the area D, I found such glasses unsatisfactory inasmuch as they were faulty due to the devitrification or incomplete fusion.

Figure 2:
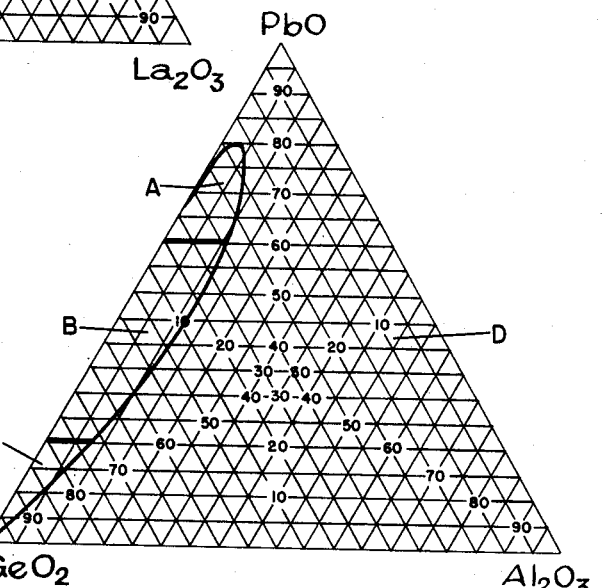
Fig. 2 is a similar diagram showing the limits of the glass-forming field of a glass system in which glasses are formed of lead oxide, germania and alumina.
Figure 3:
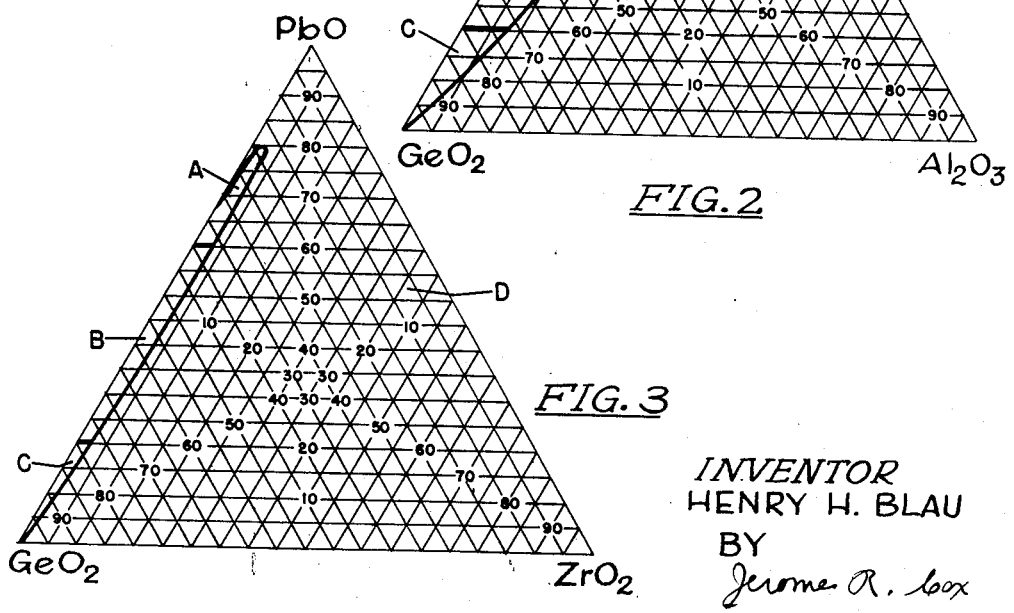
Fig. 3 is a similar diagram showing the limits of the glass in the useable glass-forming field of a glass system in which the glasses are formed of the compounds of lead oxide, germania and zirconia.

Similarly, I found that glasses formed of the components germania, lead oxide and alumina lying within the areas A, B, C and D of Fig. 2 have substantially the same characteristics as the corresponding glasses formed from germania, lead oxide and lanthana which are described above in connection with Fig. 1. In the same way glasses formed of lead oxide, germania and zirconia lying within the areas A, B, C and D of Fig. 3 correspond substantially to the corresponding glasses described above in connection with Fig. 1. As shown below, I have also discovered the advantages of a PbO—GeO$_2$—Al$_2$O$_3$—La$_2$O$_3$ system. I have also discovered the possibilities of using oxides of various other metals as a third component of a lead oxide—germania glass. Thus, the oxides of the following metals may be used: lithium, beryllium, sodium, magnesium, potassium, calcium, scandium, titanium, vanadium, chromium, manganese, zinc, gallium, rubidium, strontium, yttrium, columbium, cadmium, indium, tin, antimony, cesium, barium, cerium, praseodymium, neodymium, samarium, europium, gadolinium, terbium, dysprosium, holmium, erbium, thulium, ytterbium, lutecium, thallium, bismuth and polonium.

Where it is desired to transmit rays of long wave lengths, silicon, boron, and phosphorus, even in small amounts should not be tolerated as the presence of these materials decreases the wave length transmitted. Lanthana, alumina, zirconia, etc. affect the physical properties of the glass but do not affect the transmission, except as the transmission is affected by being able to increase the ratio of lead oxide to germanium dioxide. The third components mentioned (other than silicon, boron, and phosphorus) affect mainly the working properties of the glass such as viscosity points, handling properties, etc.

In general the ratio corresponding to the most favorable third constituent (other than GeO and PbO) seems to determine the limit for glass formation. Thus the addition of a minor quantity of MnO to a lead-germania-lanthana composition seems to permit the glass to be formed substantially as if the MnO were an additional molecular quantity of La$_2$O$_3$. The addition of lithia to an alumina glass likewise permits the glass formation to fall within the alumina ratio. If anything, these additions extend the limits of the glass-forming fields and increase the useable ratios slightly. I believe that MnO is especially beneficial in this respect.

The limits of the glass-forming field of a system employing the components lead oxide and germania only as established by the weight ratio $$\frac{PbO}{GeO_2}$$

are from 0 to 2.13 (i. e. from 100% germania to $$\frac{68\% \ PbO}{32\% \ GeO_2})$$

The limits of the glass-forming field of the components lead oxide, germania, and lanthana as established by the weight ratio $$\frac{PbO}{GeO_2}$$

are 0 to 2.6 (i. e. from 100% GeO$_2$ to $$\frac{72\% \ PbO}{28\% \ GeO_2})$$

with La$_2$O$_3$ added in amounts from 0 to 13% (naturally addition of La$_2$O$_3$ decreases the total percentages of PbO and GeO$_2$). The effect of increasing the ratios of lead oxide as shown above is to increase the total energy transmitted by transmitting longer wave lengths. However, when the maximum ratio is surpassed, the glass tends to devitrify in batches larger than five grams. With good melting techniques, the indications are that the ratio might be extended slightly. The amount of La$_2$O$_3$ which may be added is seen to reach a maximum of 13% at a ratio of about 1.0 and then decreases to about 2% at a ratio of 2.6. Greater additions of La$_2$O$_3$ caused devitrification. There are indications that small additions of alkalies may aid in increasing the ratio and consequently the total energy transmitted. However, limited quantities of alkalies appear to have little, if any, effect on the transmission by themselves. In all systems studied, relatively high ratios of PbO tend to increase transmission at longer wave lengths and also reduce the cost of the glass where an expensive network former is involved.

The limits of the glass-forming field of a mixture of the components lead oxide, germania, and alumina, as established by the weight ratio $$\frac{PbO}{GeO_2}$$

are 0 to 4.65 (i. e. from 100% GeO$_2$ to about $$\frac{79\% \ PbO}{17\% \ GeO_2})$$

with Al$_2$O$_3$ added in amounts from 0 to about 11.5%. The effect of raising the ratio of the added components is the same as in the system PbO—GeO$_2$—La$_2$O$_3$. The amount of Al$_2$O$_3$ which may be added is seen to reach a maximum at a ratio of about 1.0 (i. e.

$$\frac{44\% \ PbO}{44\% \ GeO_2}.$$

and then decrease to 4% at a ratio of about 4.6). However, a few more per cent Al$_2$O$_3$ may be incorporated by using higher melting temperatures. Greater additions of Al$_2$O$_3$ than the maximum make fusion more difficult at low ratios, and Al$_2$O$_3$ in excess of the maximum, tends to cause devitrification at higher ratios. The main useful purpose of Al$_2$O$_3$ is to permit glass formation at a higher $$\frac{PbO}{GeO_2}$$

ratio. A darkening of the yellow color of the high PbO glasses towards a brown may be observed as Al$_2$O$_3$ is added and replaces GeO$_2$. The effect of limited quantities of alkalies is the same as in the system PbO—GeO$_2$—La$_2$O$_3$.

The limits of the glass-forming field of a system consisting of PbO—GeO$_2$—ZrO$_2$ as established by the weight ratio $$\frac{PbO}{GeO_2}$$

are about 0 to 4.4 (i. e. from 100% to about $$\frac{79\% \ PbO}{18\% \ GeO_2}$$

with ZrO$_2$ added in amounts from 0 to 3%). Larger amounts of ZrO$_2$ cause either incomplete fusion or devitrification, depending on the ratio of $$\frac{PbO}{GeO_2}$$

If less than 3% of ZrO$_2$ is used, the deficiency should be replaced by GeO$_2$ rather than PbO inasmuch as the ratio 4.4 is possible only where the 3% of ZrO$_2$ is present where no third component is present.

The upper limit of the $$\frac{PbO}{GeO_2}$$

in a system where there is no third component is about 2.13% at a ratio of $$\frac{68}{32}$$

The limits of the glass-forming field of a system consisting of PbO—GeO$_2$—Al$_2$O$_3$—La$_2$O$_3$ as established by the weight ratio $$\frac{PbO}{GeO_2}$$

are about 0 to 4.45 with the sum of the percentages of Al$_2$O$_3$ and La$_2$O$_3$ varying from 0 to 10%. In general, the percentage of Al$_2$O$_3$ should either equal or exceed the percentage of La$_2$O$_3$ (especially at the higher $$\frac{PbO}{GeO_2}$$

ratios) to prevent devitrification. The effect of Al$_2$O$_3$ in this system appears to be identical with that of Al$_2$O$_3$ in the system PbO—GeO$_2$—Al$_2$O$_3$.

Below the above is set out in table form:

dry gas (such as, for example, nitrogen or oxygen) is passed under a slight positive pressure. Thereby the transmission characteristics are so improved that a chart of percent of transmission to wave lengths shows a curve with a higher percentage of transmission throughout and a curve which is smooth and free of dips at varying wave lengths.

Following are examples of glasses formed according to my invention in all of which percentages mentioned are by weight:

EXAMPLE I

I melted together 65.4% PbO, 30.0% GeO$_2$, 4.0% La$_2$O$_3$, 0.6% MnO$_2$. These components were used and allowed to solidify. Glass was obtained which had good transmission quality in the infrared region, and the manganese dioxide acts to prevent or reduce transmission of visible wave lengths as well as to stabilize the glass in the same way that the lanthana does.

*Limits of the glass-forming field in various systems as established by the ratio*

$$\frac{PbO}{GeO_2}$$

| System | Limiting Ratios | Effect of Increasing Ratio Above Maximum | Limits of Third Component | Effect of Surpassing This Limit | | Effects of Third Component |
|---|---|---|---|---|---|---|
| | | | | At Low Ratios | At High Ratios | |
| PbO—GeO$_2$—La$_2$O$_3$ | 0 to 2.6 | Causes devitrification in batches larger than 5 g. | 0 to 13% | Causes devitrification. | Causes devitrification. | Very little effect, if any. Possible decolorization. More resistance to abrasion and chemical attack. |
| PbO—GeO$_2$—Al$_2$O$_3$ | 0 to 4.65 | Same as above (Improved melting technique may extend ratio to 5.00). | 0 to 11.5% | Increases difficulty of fusion. | do | Permits increasing ratio. More resistance to abrasion and chemical attack. |
| PbO—GeO$_2$—ZrO$_2$ | 0 to 4.4 | Same as above (Improved melting technique may extend ratio. | 0 to 3% | do | do | Same as in Al$_2$O$_3$ system with a possible impairment of transmission. More resistance to abrasion and chemical attack. |
| PbO—GeO$_2$—Al$_2$O$_3$—La$_2$O$_3$ | 0 to 4.45 | Same as above | Combined 0 to 10%. | do | do | Same as in Al$_2$O$_3$ System. |

The process of obtaining these glasses is also important. Water must be removed from the glass. The process of eliminating water absorption bands is quite important and critical. The glass must be melted in a container free from silica and other harmful substances and the melt may be carried on in an atmosphere free from moisture. We prefer however, to dry after melting as disclosed below.

As stated above it is possible to eliminate the water by carrying on the melt in an atmosphere free from moisture. It is more practical however to melt without strict precautions as to moisture and to dry subsequently. We usually move the glass after melting and while in a melted condition to a drying furnace which has an atmosphere free of moisture. Through this furnace we pass a continuous stream of dry gas (such as, for example, nitrogen or oxygen) under a slight positive pressure. We may on the other hand allow the glass to solidify after being melted in an ordinary furnace. We may then remelt to purify of moisture in a drying furnace. In either event the drying furnace eliminates the contamination of water. In order to prevent such contamination, I melt the glass or preferably dry it after melting and possibly after allowing it to harden and remelting in a gas tight furnace chamber through which a continuous stream of

EXAMPLE II

I melted together 70% lead oxide, 29% germania and 1% lanthana. Glass was obtained which transmitted about 60% of the rays, at a wave length of 5 microns and approximately 20% of the rays at a wave length of 6 microns.

EXAMPLE III

I melted together and fused a mixture of 68.0% lead oxide, 29.0% germania. 3.0% lanthana and allowed the melt to solidify to form a glass which had similar transmission characteristics.

EXAMPLE IV

I melted together a glass which had a composition of 58.7% lead oxide, 36.6% germania, 4.2% lanthana and 0.5% Li$_2$O. The glass had similar good transmission characteristics. The addition of the small amounts of lithia used showed little effect on the infrared transmission; however, its presence reduced the index of refraction to some extent, thus reducing reflection losses slightly.

EXAMPLE V

I melted together 78.0% PbO, 18.0% GeO$_2$, 4.0% Al$_2$O$_3$. These components were fused and allowed to solidify. Glass was obtained which had about 35.0% transmission at 6 microns.

EXAMPLE VI

I melted together 75.0% lead oxide, 20.0% germania and 2% lanthana and 3% alumnia. Glass was obtained which transmitted about 30% of the rays, at a wave length of 6 microns.

EXAMPLE VII

I melted together and fused a mixture of 70.0% lead oxide, 29.0% germania, 1% zirconia and allowed the melt to solidify to form a glass which transmitted about 25% of the rays at a wave length of 6 microns.

EXAMPLE VIII

I melted together a glass which had a composition of 77.0% lead oxide, 18.0% germania, 4% alumina, and 1% zirconia. The glass transmitted about 30% of the rays at 6 microns.

It is to be understood that the above described embodiments of my invention are for the purpose of illustration only and various changes may be made therein without departing from the spirit and scope of my invention.

I claim:

1. A glass consisting of a plurality of oxides of which lead oxide and germanium oxide comprise by weight at least 87% of the glass and of which the remainder consists of lanthana and in which the glass consists by weight of from a trace to 72% lead oxide, from 28% to 99.9% germania and from a trace to 13% of lanthana.

2. A glass consisting by weight of a trace to 72% lead oxide, from 28% to 99.9% germania and from a trace to 13% lanthana.

3. A glass consisting by weight of a trace to 79% lead oxide, from 17% to 99.9% of germania and from a trace to 11.5% alumina.

4. A glass consisting of a plurality of oxides of which lead oxide and germanium oxide comprise by weight at least 87.0% of the composition of which the remainder is lanthana, in which the ratio by weight of lead oxide to germania is at least as great as the ratio of 0.01 to 1 and is not greater than the ratio of 2.6 to 1 and in which the percentage by weight of lanthana is less than 13% of the composition.

5. A glass consisting of a plurality of oxides of which lead oxide and germanium oxide comprise by weight at least 90.0% of the glass of which the remainder is lanthana, and in which the glass consists of from 55 to 72% lead oxide, from 28 to 45% germania and from a trace to 10% lanthana.

6. A glass consisting of lead oxide, germania, and lanthana in which the glass consists by weight of from 20 to 72% lead oxide, from 28 to 80% germania and from a trace to 13% lanthana.

7. A glass consisting by weight of from a trace to 72% lead oxide, from 28 to 99.99% germania and from a trace to 13% lanthana.

8. A method of making a glass consisting of lead oxide, germania, and not more than 13% of a stabilizing component, said stabilizing component comprising an oxide selected from the group consisting of oxides of aluminum and lanthanum, wherein the oxide of aluminum, if selected, is not more than 11.5% and the oxide of lanthanum, if selected, is not more than 13% which method consists of melting together components which are silica free, of which lead oxide and germania comprise by weight at least 87% of the mixture, and of which germania comprises by weight at least 17% of the mixture in a container free from silica and thereafter maintaining the glass in an atmosphere free of water, while the glass is in a heated condition and during the cooling process.

9. A method of making a glass consisting of lead oxide, germania, and not more than 13% of a stabilizing component, said stabilizing component comprising an oxide selected from the group consisting of oxides of aluminum and lanthanum, wherein the oxide of aluminum, if selected, is not more than 11.5% and the oxide of lanthanum, if selected, is not more than 13% which method consists of melting together components which are silica free, of which lead oxide and germania comprise by weight at least 87% of the mixture, in a container free from silica.

10. A method of making a glass consisting of lead oxide, germania, and not more than 13% of a stabilizing component, said stabilizing component comprising an oxide selected from the group consisting of oxides of aluminum and lanthanum, wherein the oxide of aluminum, if selected, is not more than 11.5% and the oxide of lanthanum, if selected, is not more than 13% which method consists of melting together the components of which lead oxide and germania comprise by weight at least 87% of the mixture and of which germania comprises by weight at least 17% of the mixture, removing the melt to and maintaining it until cooled in a gas tight furnace and in an atmosphere free of water and water vapor, and passing through the furnace a continuous stream of dry gas under a slight positive pressure.

11. A method of making a glass consisting of lead oxide, germania and not more than 13% of a stabilizing component, said stabilizing component comprising an oxide selected from the group consisting of oxides of aluminum and lanthanum, wherein the oxide of aluminum, if selected, is not more than 11.5% and the oxide of lanthanum, if selected, is not more than 13% which method consists of melting together the components of which lead oxide and germania comprise by weight at least 87% of the mixture and of which germania comprises by weight at least 17% of the mixture to form a glass, and removing the glass, and remelting the glass and maintaining it until cooled in a gas tight furnace and in an atmosphere free of water and water vapor.

12. A method of making a glass consisting of lead oxide, germania and not more than 13% of a stabilizing component, said stabilizing component comprising an oxide selected from the group consisting of oxides of aluminum and lanthanum, wherein the oxide of aluminum, if selected, is not more than 11.5% and the oxide of lanthanum, if selected, is not more than 13% which method consists of melting together the components of which lead oxide and germania comprise by weight at least 87% of the mixture and of which germania comprises by weight at least 17% of the mixture and thereafter removing the melt to and maintaining it in an atmosphere free of water and water vapor, while the glass is in a heated condition and during the cooling process.

13. A glass consisting of a plurality of at least three different oxides, of which lead oxide and germanium oxide comprise by weight at least 87% of the glass; in which glass there is from a trace to 79% of lead oxide, from 17% to 99.9% of germania and at least a trace of a third oxide; and in which glass the remainder of the composition in addition to the lead oxide and germanium oxide comprises an oxide permitting the use of a higher lead-germania ratio and being selected from the group consisting of oxides of aluminum and lanthanum, wherein the oxide of aluminum, if selected, is not more than 11.5% and the oxide of lanthanum, if selected is not more than 13%.

14. A glass of claim 13 in which said remainder consists of alumina.

15. A glass of claim 13 in which said remainder consists of lanthana.

16. A glass of claim 13 in which said remainder consists of a mixture of the oxides of manganese and lanthanum.

17. A glass of claim 13 in which said remainder consists of a mixture of the oxides of aluminum and zirconium.

18. A glass of claim 13 in which said remainder consists of oxides of lithium and lanthanum.

19. A glass according to claim 13 in which said remainder consists substantially of oxides of aluminum and lanthanum.

References Cited in the file of this patent

UNITED STATES PATENTS

| Number | Name | Date |
|---|---|---|
| 1,607,817 | Dennis | Nov. 23, 1926 |